United States Patent Office 3,433,823
Patented Mar. 18, 1969

3,433,823
PRODUCTION OF NITRILES
Joseph F. McMahon, Clinton, N.J., assignor to Princeton Chemical Research, Inc., Princeton, N.J., a corporation of New Jersey
No Drawing. Continuation-in-part of application Ser. No. 336,893, Jan. 10, 1964, which is a continuation of application Ser. No. 399,878, Sept. 28, 1964. This application Mar. 18, 1968, Ser. No. 714,119
U.S. Cl. 260—465.3    5 Claims
Int. Cl. C07c 121/32, 121/02, 121/10

ABSTRACT OF THE DISCLOSURE

A catalytic process for preparing methacrylonitrile from isobutane, or isobutylene, oxygen and ammonia, at elevated temperature, said catalyst being a vanadium phosphate in conjunction with at least one of molybdenum oxide, copper oxide, tungsten oxide, thorium oxide, uranium oxide and/or zirconium oxide and said catalyst being separately deposited on different particles of a carrier of substantially inert character.

This invention relates to the production of nitriles and is a continuation-in-part of my copending application Ser. No. 336,893, filed Jan. 10, 1964, and a continuation of Ser. No. 399,878, filed Sept. 28, 1964. The invention more particularly relates to the production of unsaturated aliphatic and aromatic nitriles from corresponding hydrocarbons.

It is known that certain unsaturated hydrocarbons may be catalytically oxidized to the corresponding aldehydes and these aldehydes converted to nitriles by reaction with ammonia.

It has generally been found necessary and desirable to effect the reaction in two separate steps or stages as the catalysts which favor the initial oxidation of the olefins are inhibited by the presence of ammonia.

It is an object of the instant invention to effect the conversion of certain hydrocarbons to unsaturated or aromatic nitriles in a one-step catalytic conversion.

A further object this invention is a certain catalyst system effective for the catalytic gas phase conversion of hydrocarbons to nitriles by reaction with oxygen and ammonia.

These and still further objects will become apparent from the following description:

In accordance with the invention it has been found that hydrocarbons having a methyl radical may be efficiently converted with good selectivity to the corresponding nitriles by a vapor phase catalytic reaction with oxygen and ammonia using a catalyst containing vanadium, phosphorus, oxygen, and a member selected from the group consisting of molybdenum, copper, tungsten, thorium, uranium, and zirconium.

The starting hydrocarbons which are converted in accordance with the invention may be any hydrocarbons which contain a methyl radical attached to an unsaturated carbon atom, the term unsaturated carbon atom including carbon atoms in ring structure, such as an aromatic ring, where the unsaturated bond or bonds may be of the resonating type.

The starting hydrocarbons may also be saturated hydrocarbons corresponding to the above-described unsaturated hydrocarbons, i.e. hydrocarbons which may be converted to the above-described unsaturated hydrocarbons by dehydrogenation.

When the starting hydrocarbons are unsaturates the same may be alpha, methyl, olefins (β-olefins) as for example propylene, butylene, isobutylene, or higher homologues thereof or the corresponding diolefins, methyl aromatic compounds, such as toluene, xylene, methyl naphthalene or alkylaryl compounds having a methyl group bound to an aromatic ring or an alpha-unsaturated carbon atom.

When the starting hydrocarbons are saturates, the same may be any of the alkanes having at least three carbon atoms or any methyl substituted cycloalkanes. In connection with the alkanes, propane, isobutane, and the higher homologues of isobutane are preferred. Examples of methylcycloalkanes which may be used include: methylcyclohexane, methylcyclopentane, other methylnaphthenes, methyl Decalin, and the like.

The oxygen used in the reaction is most conveniently in its mixture in air but may be added per se or in admixture with any inert gas or with the ammonia.

The catalyst must contain vanadium, phosphorus, oxygen, and preferably molybdenum. In place of the molybdenum, however, copper, tungsten, thorium, uranium, or zirconium may be used.

The vanadium is most preferably in the form of a compound or complex with phosphorus and oxygen which is referred to herein as a vanadium polyphosphate. The vanadium polyphosphate may be formed by reacting phosphoric acid with vanadium oxalate.

In accordance with a preferred mode of preparation, vanadium pentoxide is first dissolved in an aqueous solution of oxalic acid. The concentration of the oxalic acid in the solution and the mol ratio of the oxalic acid to the vanadium pentoxide may vary over wide limits. Thus, concentrations of oxalic acid between about 0.5 and 40 weight percent and preferably between about 10 and 30 weight percent may advantageously be used. Mol ratios of the vanadium pentoxide to the oxalic acid may vary between about 0.05:1.0 to 1.0:1.0 and preferably between about 0.2:1.0 to about 0.5:1.0. The dissolving of the vanadium pentoxide in the oxalic acid solution may be effected at a temperature between about 0° C. to about 250° C. and preferably between about 50° C. and 150° C. When the vanadium pentoxide is dissolved in the oxalic acid solution, the solution turns a deep blue color. To this blue solution the phosphoric acid is added. Phosphoric acid may be in the form of a concentrated solution of $H_3PO_4$ in water or in the form of a compound, such as $P_2O_5$ which will yield phosphoric acid in the solution. The amounts of phosphoric acid which may be used vary over wide limits from an amount corresponding to an atom ratio of phosphorus to vanadium of about 0.1 to about 3.5 and preferably between about 1.0 to about 2.5.

The solution formed upon the addition of the phosphoric acid should be maintained at a temperature between about 0° C. to about 250° C. and is preferably aged at this temperature for a period of time ranging from several minutes up to 48 hours and generally about 1 hour. The excess water is then removed from the solution by evaporation as for example by heating and/or the application of vacuum until a dry powder is obtained. The final temperature of the dried powder may vary between about 200° C. to about 500° C. The dried powder is then formed into appropriate size particles in any known or conventional manner, as for example by pelletizing, granulating or the like. For fixed bed operation, the powder is generally formed into particles ranging in size from 1/64" to 1/2" and preferably 1/32" to 1/4" and may be deposited on an inert carrier, such as alumina, silica, or silicon carbide having a particle size between about 1/64" and 1/2". The amount of the vanadium polyphosphate deposited on the carrier may vary between about 5 to 60 weight percent and preferably between about 10 to 30 weight percent based on the total weight of the polyphosphate and the carrier. In general, vanadium polyphosphate should be deposited on the carrier in amounts sufficient to substantially coat the surface of the carrier.

For use in a fluidized bed, the dried powder may be ground and screened to a particle size range between about 10 and 250 microns with the average particle diameter being perferably between about 40 and 80 microns. For fluidized bed operation it has been found convenient to spray dry the vanadium pentoxide oxalic acid phosphoric pentoxide solution so as to form microspherical particles with diameters in the range of between about 10 to 250 microns.

The second component of the catalyst, i.e., the molybdenum, copper, tungsten, thorium, uranium, or zirconium is preferably in the form of an oxide, but the same may also contain phosphates, borates, and antimonates, as for example of vanadium.

The second component may have the same particle size ranges for fixed bed and fluidized operation as the first component and also be deposited on a carrier such as aluminum, silica, or silicon carbide in amounts of 1 to 60 and preferably 5 to 30 weight percent based on the total in the metal compound and carrier. It is also possible to deposit both the vanadium polyphosphate and the second component on the same carrier.

The ratio of the two components of the catalytic mixture may be varied within wide limits ranging between 1 to 20 and 20 to 1 based on the weights of the components, and the atom ratio of the metal of the second component, such as the Mo to the vanadium may vary between 0.01 and 10.0.

In addition, to the use of a single metal compound as the second component, a mixture of two or more of the metal compounds specified may be used, in which case the amounts as indicated above relate to the amount of the total mixture of two or more of the molybdenum, copper, tungsten, thorium, uranium or zirconium compounds, and preferably oxides.

Additionally, the catalysts may contain alkali metal oxide such as lithium, sodium, or potassium oxide in an atom ratio to vanadium of up to 1.0.

The hydrocarbons are converted to the nitriles in accordance with the invention by passing the same in the vapor phase in admixture with the oxygen, such as in the form of air, and ammonia, in contact with the catalyst at a temperature between about 300–650° C., and preferably between about 425 and 575° C. The concentration of the hydrocarbon to be converted in the gaseous feed should be at least 0.2 mol percent and should preferably be at least 0.5 mol percent. For reasons of safety, it is generally desirable not to use higher concentrations than 3.0 mol percent and the most preferred range of concentration is between 0.5 to 1.5 mol percent.

The ratio of molecular oxygene to the hydrocarbon in the total feed may vary between about 0.5 and 50 and is preferably between about 10 and 30.

The mol ratio of ammonia to the hydrocarbon being converted in the total feed gas may also be varied within wide limits between about 0.2 and 20 and preferably between about 1.0 and 10.0. While substantially pure ammonia is normally used, the same may be admixed with inert gases or aqueous solutions of ammonium hydroxide may be employed.

The contacting of the reactive gas stream with the catalyst may be effected, either as a fixed bed, fluidized bed, or semifluidized bed operation at normal or elevated pressures, as for example, pressures ranging from atmospheric to 1,000 p.s.i. gauge. In addition, the reactive gas stream may contain an inert gas, as for example, nitrogen or the like, and/or water with a mol ratio of the inert gas and water to the hydrocarbon in the feed each being between about 0 and 100.

The reactor may be constructed of any suitable material, as for example, a glass, such as quartz glass, metals, such as stainless steel, carbon steel, Monel, Inconel, etc., with a suitable arrangement being provided for removing the heat generated in the exothermic reaction to maintain the temperature within the range indicated above.

For fixed bed operation, it has been found preferable to utilize multi-tube heat exchanger type reactors, cooled with any suitable heat exchange medium, as for example, eutetic salt baths such as mixtures of sodium nitrate, potassium nitrate, and sodium nitrate. In fluidized bed operation, the bed may be fluidized by the reactive gas stream with the exothermic heat of reaction being carried out of the system as sensible heat for the process gases and/or by a heat exchange arrangement. The unreacted and partially reacted materials from the gas stream may be recovered and recycled generally with a suitable addition of fresh reactant gas.

Flow rate of total reactor feed gas, including hydrocarbon, ammonia, oxygen, steam, inert gas, and any recycled materials, may vary between 0.01 and 100 volumes of total gas, measured at the temperature and pressure of the reaction, per volume of catalyst per hour, with flow rates between 1.0 and 20.0 volumes of total gas per volume of catalyst per hour being preferred.

The nitrile formed by the reaction may be recovered from tail gas stream in any desired manner. Since, however, the unsaturated nitriles produced may react to form polymerization, condensation products, particularly in the presence of unreacted ammonia, it is preferable to recover the formed nitrile by absorption in water or other solvent containing sufficient acid such as sulfuric acid to neutralize any unreacted ammonia. It has been found preferable to cool the product gases rapidly and to limit the residence time of the product gases in the cooling zone prior to absorption in acidified water to 10% or less of the total residence time of the gases in the reactor. Alternately, it may be desirable to inject an acid containing stream into the tail gases leaving the catalytic reactor in order to neutralize unreacted ammonia prior to or concurrent with rapid cooling of these gases. The unsaturated nitriles may be recovered from the absorption solvent by any suitable means, such as fractional distillation, selective extraction, or the like.

The following examples are given by way of illustration and not limitation:

EXAMPLE 1

A vanadium polyphosphate was formed by dissolving 200.5 grams of oxalic acid dihydrate in 343 cc. of distilled water and adding 80.6 grams of vanadium pentoxide to this oxalic acid solution warmed to a temperature of about 80° C. 192.6 grams of an 85.7 weight percent solution of phosphoric acid was then added to the vanadium pentoxide-oxalic acid solution. The solution was then heated in a tumbling device for a period of 2 hours, and when a temperature of 350–365° C. was reached, the dry powder was discharged from the tumbling device. Pellets of $\frac{3}{16}''$ diameter were formed from the powder using a conventional (Stokes) pelleting machine. The pellets were then crushed and screened through a 10 mesh (U.S. Standard) screen with the material being recovered on a 20 mesh screen. The atom ratio of the phosphorus to vanadium in the vanadium polyphosphate was 1.9. As the second component molybdenum oxide, in the form of 15 weight percent $MoO_3$ supported on alumina and having a particle size between 10 and 20 mesh was used.

17.5 cc. of the vanadium polyphosphate and 17.5 cc. of the molybdenum oxide was mixed to form a first batch. 8.5 cc. of the vanadium polyphosphate was mixed with 8.5 cc. of the molybdenum oxide and 18 cc. of 6 to 10 mesh alumina which had been extracted with HCl, water washed, and dried to form a second batch. 4.2 cc. of the vanadium polyphosphate was admixed with 4.2 cc. of the molybdenum oxide and 26.6 cc. of alumina as described above to form a third batch. 2.2 cc. of the vanadium polyphosphate was mixed with 2.2 cc. of the molybdenum oxide and 30.6 cc. of alumina as described above to form a fourth batch.

An Inconel tube reactor of 1" diameter and 32" length was charged with four batches, with the first batch filling a bottom 35 cc. zone, the second batch a 35 cc. zone thereabove, the third batch a 35 cc. zone thereabove, and the fourth batch filling the top 35 cc. zone.

Isobutylene, oxygen, nitrogen, water vapor and ammonia were passed downwardly through the catalyst bed under the conditions as specified in Table I below and methacrylonitrile was recovered in the yields indicated. The reactor was initially heated to 800° F. and the temperatures were maintained at the values indicated in Table I.

The Inconel tube reactor was surrounded by a jacket containing 13% alumina–87% silica cracking catalyst fluidized with air to carry off the exothermic heat of the reaction.

TABLE 4

Feed: Propylene.
Catalyst: Vanadium phosphate, P/V=1.0+15% $MoO_3$ on Alundum.

| | |
|---|---|
| Temperature, °F. | 810 |
| Pressure, p.s.i.g. | 200 |
| Percent proylene in total feed | 0.9 |
| $H_2O$/propylene, mol ratio | 12 |
| $O_2$/propylene, mol ratio | 10 |
| $NH_3$ propylene, mol ratio | 2.3 |
| Space velocity, liters/hr./cc. | 6.6 |
| Propylene conversion, mol percent | 34 |
| Selectivity to acrylonitrile, mol percent | 27 |

EXAMPLE 5

The previous examples may be repeated using in place of the molybdenum oxide or copper oxide, respectively,

TABLE 1

| | | | | | | | | | |
|---|---|---|---|---|---|---|---|---|---|
| Temperature, °F. | 830 | 813 | 812 | 832 | 821 | 828 | 750 | 820 | 885 |
| Pressure, p.s.i.g. | 320 | 220 | 110 | 316 | 316 | 308 | 315 | 320 | 320 |
| Percent isobutylene in total feed | 0.8 | 0.8 | 0.8 | 0.8 | 0.9 | 0.8 | 0.9 | 0.9 | 0.9 |
| $H_2O$/isobutylene, mol ratio | 7 | 6 | 7 | 9 | 9 | 9 | 7 | 10 | 9 |
| $O_2$/isobutylene, mol ratio | 10 | 10 | 9 | 9.3 | 5.4 | 3.2 | 8 | 9 | 8 |
| $NH_3$/isobutylene, mol ratio | 3.1 | 2.6 | 2.8 | 0.7 | 0.6 | 0.6 | 1.2 | 1.3 | 1.3 |
| Space velocity, liters/hr./cc. | 7.5 | 7.6 | 7.9 | 7.8 | 6.9 | 7.4 | 7.8 | 7.5 | 7.1 |
| Isobutylene conversion, mol percent | 70 | 53 | 68 | 89 | 68 | 58 | 49 | 70 | 98 |
| Selectivity to methacrylonitrile, mol percent | 56 | 64 | 74 | 33 | 25 | 49 | 4 | 34 | 33 |

EXAMPLE 2

Example 1 was repeated except copper oxide was used in place of the molbdenum oxide as the second catalyst component. The copper oxide was in the form of a 15 weight percent CuO supported on alumina. With the use of this catalyst, isobutylene was converted to methcrylonitrile under the conditions as indicated in Table 2 below:

TABLE 2

| | | |
|---|---|---|
| Temperature, °F. | 755 | 780 |
| Pressure, p.s.i.g. | 330 | 110 |
| Percent isobutylene in total feed | 0.7 | 0.8 |
| $H_2O$/isobutylene, mol ratio | 8 | 7 |
| $O_2$/isobutylene, mol ratio | .12 | 10 |
| $NH_3$/isobutylene, mol ratio | 3.3 | 3.1 |
| Space velocity, liters/hr./cc. | 7.9 | 8.2 |
| Isobutylene conversion, mol percent | 10 | 13 |
| Selectivity to methacrylonitrile, mol percent | 71 | 74 |

EXAMPLE 3

Example 2 was repeated using, however, propylene and toluene, respectively, in place of the isobutylene. The reaction conditions and the results obtained are indicated in Table 3 below:

TABLE 3

| Catalyst | Vanadium Phosphate, P/V=1.9 +15% CuO on Alumina | | Toluene |
|---|---|---|---|
| Feed | propylene | Propylene | |
| Temperature, °F. | 935 | 840 | 830 |
| Pressure, p.s.i.g. | 310 | 200 | 320 |
| Percent hydrocarbon in total feed | 0.7 | 0.9 | 0.7 |
| $H_2O$/hydrocarbon, mol ratio | 22 | 8 | 8 |
| $O_2$/hydrocarbon, mol ratio | 10 | 10 | 11 |
| $NH_3$/hydrocarbon, mol ratio | 3.9 | 3.2 | 3.4 |
| Space velocity, liters/hr./cc. | 8.3 | 6.7 | 7.4 |
| Hydrocarbon conversion, mol percent | 41 | 8 | 26 |
| Selectivity to— | | | |
| Acrylonitrile, mol percent | 20 | 60 | |
| Benzaldehyde | | | 23 |
| Benzonitrile | | | 24 |

EXAMPLE 4

Example 3 was repeated using propylene as the feed and utilizing a catalyst prepared as described in Example 1 except with an atom ratio of phosphorus to vanadium of 1.0. The reaction conditions and the results obtained are indicated in Table 4 below.

tungsten oxide, thorium oxide, uranium oxide, and zirconium oxide, and comparable results will be obtained.

EXAMPLE 6

Example 3 may be repeated using xylene in place of toluene and the corresponding benzene dinitrile will be formed.

EXAMPLE 7

A molybdenum containing compound was prepared in the following manner. 100 cc. of a concentrated HCl solution, containing 37.0 weight percent HCl was added to a 500 cc. flask. 38.8 grams of vanadium pentoxide was added to the HCl solution. The resulting brown-colored slurry was heated at refluxing temperature for 4.5 hours. An additional 300 cc. of concentrated HCl solution was added to the flask and refluxing continued for 16 hours until a homogeneous blue solution was obtained. 18.3 grams of molybdenum trioxide was added to the flask and refluxing continued for 2 hours until a homogenous solution was again obtained. 31.8 grams of an 85.0 weight percent solution of phosphoric acid was added to the flask and refluxing continued for 2.5 hours. 194.7 grams of fused alumina, which had been crushed and screened to 10–20 mesh, extracted with hot HCl solution, washed with distilled water, and dried, was added to the hot molybdenum oxide-vanadium oxide-phosphoric acid-HCl solution. The mixture was placed in a heated tumbling device and mixed for 3 hours until a dry powder was obtained. Based on reagents used, the dried powder contained 28.0 weight percent of molybdenum-vanadium-hposphorus oxides coated on alumina. The composition of the mixed oxides corresponded to 26.7 mol percent $MoO_3$.44.4 mol percent $V_2O_5$ and 28.9 mol percent $P_2O_5$.

6.0 cc. of a vanadium polyphosphate formed as described in Example 1 was mixed with 4.0 cc. of the molybdenum-vanadium-phosphorus oxygen compound described above to form a first batch. 3 cc. of a vanadium-polyphosphate formed as described in Example 1 was mixed with 2 cc. of the above-described molybdenum-vanadium-phosphorus-oxygen compound and 5 cc. of 10 to 20 mesh alumina which had been extracted with HCl, water washed and dried to form a second batch. 2 cc. of a vanadium-polyhposphate formed as described in Example 1 was mixed with 2 cc. of the molybdenum-vanadium-phosphorus-oxygen compound and 16 cc. 10–20 mesh alumina described above to form a third batch.

A Vycor reactor of 1.2 cm. diameter and 90 cm. long was charged with the three batches with the first batch at the bottom, the second batch intermediate, and the third batch on top, and the reactor was surrounded by a 2.5 cm. diameter Vycor tube containing a bed of 13% alumina–87% silica cracking catalyst fluidized with air. The entire assembly was mounted in a 1″ diameter 26″ long electric furnace and was heated to a temperature of 475° C. and a gas stream containing isobutylene, air, ammonia, and water vapor was passed downwardly through the catalyst bed. The ammonia and water vapor were added to the gas stream by saturating a portion of the gas stream with ammonium hydroxide solution. Samples of the gaseous feed stream and product stream were taken periodically during the experiment and analyzed by gas chromatography. The following Table, No. 5, indicates the composition of the gas feed, the reaction conditions, and the results obtained:

TABLE 5

| | | | | |
|---|---|---|---|---|
| Temperature, °C | 475 | 475 | 475 | 475 |
| Percent isobutylene in total feed | 0.86 | 0.82 | 0.82 | 0.84 |
| $O_2$/isobutylene, mol ratio | 22.4 | 23.9 | 23.9 | 23.0 |
| $NH_3$/isobutylene, mol ratio | 1.0 | 1.0 | 1.8 | 3.3 |
| $H_2O$/isobutylene, mol ratio | 0.03 | 0.04 | 0.06 | 0.10 |
| Catalyst load, vol. gas/vol. cat./sec. | 0.24 | 0.47 | 0.51 | 0.51 |
| Isobutylene conversion, mol percent | 83 | 89 | 79 | 57 |
| Selectivity to methacrylonitrile, mol percent | 15 | 10 | 14 | 24 |

EXAMPLE 8

Example 7 was repeated. However, a capillary glass tube having an inside diameter of 1 millimeter was inserted in the reactor immediately below the catalyst bed. This capillary glass tubing was maintained at an average temperature of 200° C. and the feed rate was controlled so that the residence time in this cooling zone was about 0.01 seconds. The reaction conditions and results obtained are indicated in the following Table 6:

TABLE 6

| | |
|---|---|
| Temperature, °C. | 450 |
| Percent isobutylene in total feed | 0.90 |
| $O_2$/isobutylene, mol ratio | 21.2 |
| $NH_3$/isobutylene, mol ratio | 3.7 |
| Catalyst load vol. gas/vol. cat/sec. | 0.52 |
| Isobutylene conversion, mol percent | 95 |
| Selectivity to methacrylonitrile | 30 |

EXAMPLE 9

Example 1 was repeated using, however, in place of the isobutylene the hydrocarbons listed in column 1. In each case the corresponding nitrile indicated in column 2 is formed:

| Column 1 | Column 2 |
|---|---|
| Propylene | Acrylonitrile. |
| 2-butene | 2-butenenitrile. |
| 2-pentene | 2-penenitrile. |
| 2-methyl-2-butene | 2-methyl-2-butenenitrile. |
| 2-hexene | 2-hexenenitrile. |
| 2-methyl-2-pentene | 2-methyl-2-pentenenitrile. |
| 3-methyl-2-pentene | 3-methyl-2-pentenenitrile. |
| 2,4-hexadiene | 1,4-cyano[1,4-butadiene[. |
| 2,4 heptadiene | 1,5-cyano[1,4-pentadiene]. |
| Toluene | Benzonitrile. |
| Xylene | Tolunitrile. |
| Do | Isophthalonitrile. |
| Do | Terephthalonitrile. |
| Do | Phthalonitrile. |
| 1-phenylpropene | 1-phenylpropenenitrile. |
| Methylnaphthalene | Naphthylnitrile. |
| 1,4-dimethylnaphthalene | 1,4-cyanonaphthalene. |

EXAMPLE 10

A vanadium - phosphorus - oxygen compound was prepared by reacting vanadium oxalate and phosphoric acid as described in Example 1. As the second component, molybdenum oxide, in the form of 15 wt. percent $MoO_3$ supported on alumina was used.

20.0 cc. of the vanadium polyphosphate and 20.0 cc. of the molybdenum oxide were mixed and charged to a Vycor reactor of 1.2 cm. diameter and 90 cm. long. The reactor was surrounded by a 2.5 cm. diameter Vycor tube containing a bed of 13% alumina–87% silica cracking catalyst fluidized with air. The entire assembly was mounted in a 1″ diameter, 26″ long electric furnace.

A gas stream containing paraxylene, air, ammonia, and water vapor, was passed downflow through the catalyst bed. The ammonia and water vapor were added to the gas stream by saturating a portion of the gas stream with ammonium hydroxide solution.

Gas stream leaving the reactor was cooled and the reaction products which solidified at room temperature were collected in a cylindrical paper filter. Reaction products were recovered from the filter, and analyzed by gas chromatography. Operating conditions and experimental results are given in Table 7.

TABLE 7.—PREPARATION OF TEREPHTHALONITRILE

| | | | |
|---|---|---|---|
| Temperature, °F | 875 | 925 | 850 |
| Pressure, p.s.i.g | 0 | 0 | 0 |
| Percent p-xylene in total feed | 0.4 | 0.4 | 0.4 |
| $H_2O$/p-xylene, mole ratio | 0.8 | 0.3 | 1.3 |
| $O_2$/p-xylene, mole ratio | 55.0 | 57.0 | 53.0 |
| $NH_3$/p-xylene, mole ratio | 7.6 | 3.2 | 12.2 |
| Space velocity, liters/hr./cc | 1.8 | 1.7 | 1.7 |
| p-Xylene conversion, mole percent | 100 | 100 | 100 |
| Selectivity to terephthalonitrile, mole percent | 70 | 40 | 58 |

EXAMPLE 11

A vanadium-phosphorus oxygen compound was prepared by reacting vanadium oxalate and phosphoric acid as described in Example 1. Phosphorus to vanadium atom ratio of the vanadium phosphate was 1.9. As the second component of the catalyst mixture, molybdenum oxide, in the form of 15 wt. percent $MoO_3$ supported on α-alumina, was used.

14.0 cc. of the vanadium phosphate, 14.0 cc. of the molybdenum oxide, and 7.0 cc. of 6–10 mesh, HCl washed, α-alumina, were mixed to form a first batch. 8.0 cc. of the vanadium phosphate, 8.0 cc. of the molybdenum oxide, and 19.0 cc. of the α-alumina, were mixed to form a second batch. 6.0 cc. of the vanadium phosphate, 6.0 cc. of the molybdenum oxide, and 23.0 cc. of the α-alumina, were mixed to form a third batch. 4.0 cc. of the vanadium phosphate, 4.0 cc. of the molybdenum oxide, and 27.0 cc. of the α-alumina were mixed to form a fourth batch.

An Inconel tube reactor of 1″ diameter and 32″ length was charged with the four batches, with the first batch filling a bottom 35 cc. zone, the second batch a 35 cc. zone thereabove, the third batch a 35 cc. zone thereabove, and the fourth batch a top 35 cc. zone.

Isobutane, oxygen, nitrogen, water vapor, and ammonia were passed downwardly through the catalyst bed under conditions specified in Table 8, columns 1 and 2, and methacrylonitrile was recovered in the yields indicated.

EXAMPLE 12

A vanadium-phosphorus-oxygen compound was prepared by reacting vanadium oxalate with phosphoric acid as described in Example 1. Phosphorus to vanadium atom ratio of the vanadium phosphate was 1.5. As the second component of the catalyst mixture, molybdenum oxide, in the form of 15 wt. percent $MoO_3$ supported on α-alumina, was used.

Four batches of the vanadium phosphate, molybdenum oxide and HCl washed α-alumina were prepared and charged to the 1″ diameter Inconel reactor exactly as described in Example 11. Isobutane, oxygen, nitrogen, water vapor, and ammonia were passed downwardly through the catalyst bed under conditions specified in Table 8, columns 3, 4, 5, and 6, and methacrylonitrile was recovered in the yields indicated.

TABLE 8

| | Example 11 | | Example 12 | | | |
|---|---|---|---|---|---|---|
| | 1 | 2 | 3 | 4 | 5 | 6 |
| Temperature, °F | 910 | 950 | 1,050 | 1,050 | 1,050 | 1,050 |
| Pressure, p.s.i.g | 50 | 50 | 50 | 50 | 50 | 50 |
| Percent isobutane in total feed | 0.8 | 0.8 | 0.9 | 0.8 | 0.8 | 0.8 |
| H$_2$O/isobutane, mole ratio | 11 | 11 | 10 | 7.5 | 7.7 | 7.9 |
| O$_2$/isobutane, mole ratio | 13 | 13 | 6.4 | 9.6 | 6.6 | 4.3 |
| NH$_3$/isobutane, mole ratio | 0.5 | 0.5 | 0.6 | 3.1 | 3.2 | 3.3 |
| Space velocity, liters/hr./cc | 6.6 | 6.6 | 6.6 | 7.7 | 7.0 | 6.8 |
| Isobutane conversion, mole percent | 16 | 28 | 36 | 45 | 31 | 23 |
| Selectivity to methacrylonitrile, mole percent | 49 | 33 | 6 | 15 | 44 | 59 |

What is claimed is:

1. Process of producing methacrylonitrile, which comprises reaction in the vapor phase at a temperature of 300 to 650° C. of at least one of the hydrocarbons isobutane of isobutylene with oxygen and ammonia in the presence of a two-component catalyst, introduced as a composition consisting essentially of a first component, which is a vanadium phosphate formed by the reaction of vanadium oxylate and phosphoric acid, and a second separate, distinct component which is at least one member selected from the group consisting of molybdenum oxide, copper oxide, tungsten oxide, thorium oxide, uranium oxide and zirconium oxide, each of which catalyst components being separately deposited on different particles of substantially inert character.

2. The process claimed in claim 1, wherein the ratio of the metal to the second component to vanadium is about 0.01 to 5, wherein the ratio of vanadium to phosphorus is about 0.1 to 3.5, wherein the mole ratio of oxygen to the C$_4$ hydrocarbon is about 0.5 to 50, and wherein the mole ratio of ammonia to said hydrocarbon is about 0.2 to 20.

3. The process claimed in claim 2, wherein said second catalyst component is molybdenum.

4. The process claimed in claim 1, wherein said inert particles are α-alumina.

5. The process claimed in claim 1, wherein said hydrocarbon is isobutylene.

References Cited

UNITED STATES PATENTS

| 2,450,636 | 10/1948 | Denton et al. |
| 2,481,826 | 9/1949 | Cosby. |
| 2,507,625 | 5/1950 | Ehrhardt et al. |
| 2,772,244 | 11/1956 | Shalit. |
| 2,828,325 | 3/1958 | Hardy. |
| 2,833,807 | 5/1958 | Farkas et al. |
| 2,904,580 | 9/1959 | Idol. |
| 2,987,538 | 6/1961 | Gasson. |
| 3,009,943 | 11/1961 | Hadley et al. |
| 3,118,928 | 1/1964 | Garrison. |
| 3,156,707 | 11/1964 | Kerr. |
| 3,161,670 | 12/1964 | Adams et al. |
| 3,226,421 | 12/1965 | Giordano et al. |
| 3,232,978 | 2/1966 | Yasuhara et al. |
| 3,342,849 | 9/1967 | Brill et al. |

FOREIGN PATENTS

| 913,832 | 12/1962 | Great Britain. |
| 37/4,118 | 6/1962 | Japan. |
| 37/11,008 | 8/1962 | Japan. |
| 38/14,717 | 8/1963 | Japan. |

OTHER REFERENCES

Derwent Belgian Report No. 66A (Kogyo), July 15, 1960, page A23.

JOSEPH P. BRUST, *Primary Examiner.*

U.S. Cl. X.R.

252—437; 260—464, 465; 252—432; 260—599

UNITED STATES PATENT OFFICE
CERTIFICATE OF CORRECTION

Patent No. 3,433,823                                      March 18, 1969

Joseph F. McMahon

It is certified that error appears in the above identified patent and that said Letters Patent are hereby corrected as shown below:

Column 3, line 21, "aluminum" should read -- alumina --. Column 4, line 7, "eutetic" should read -- eutectic --. Column 9, line 23, "of isobutylene" should read -- or isobutylene --.

Signed and sealed this 7th day of April 1970.

(SEAL)
Attest:

Edward M. Fletcher, Jr.                              WILLIAM E. SCHUYLER, JR.
Attesting Officer                                               Commissioner of Patents